Nov. 13, 1928.
G. ERNST
1,691,545
GAUGE GLASS ATTACHMENT
Filed Dec. 17, 1925   2 Sheets-Sheet 2
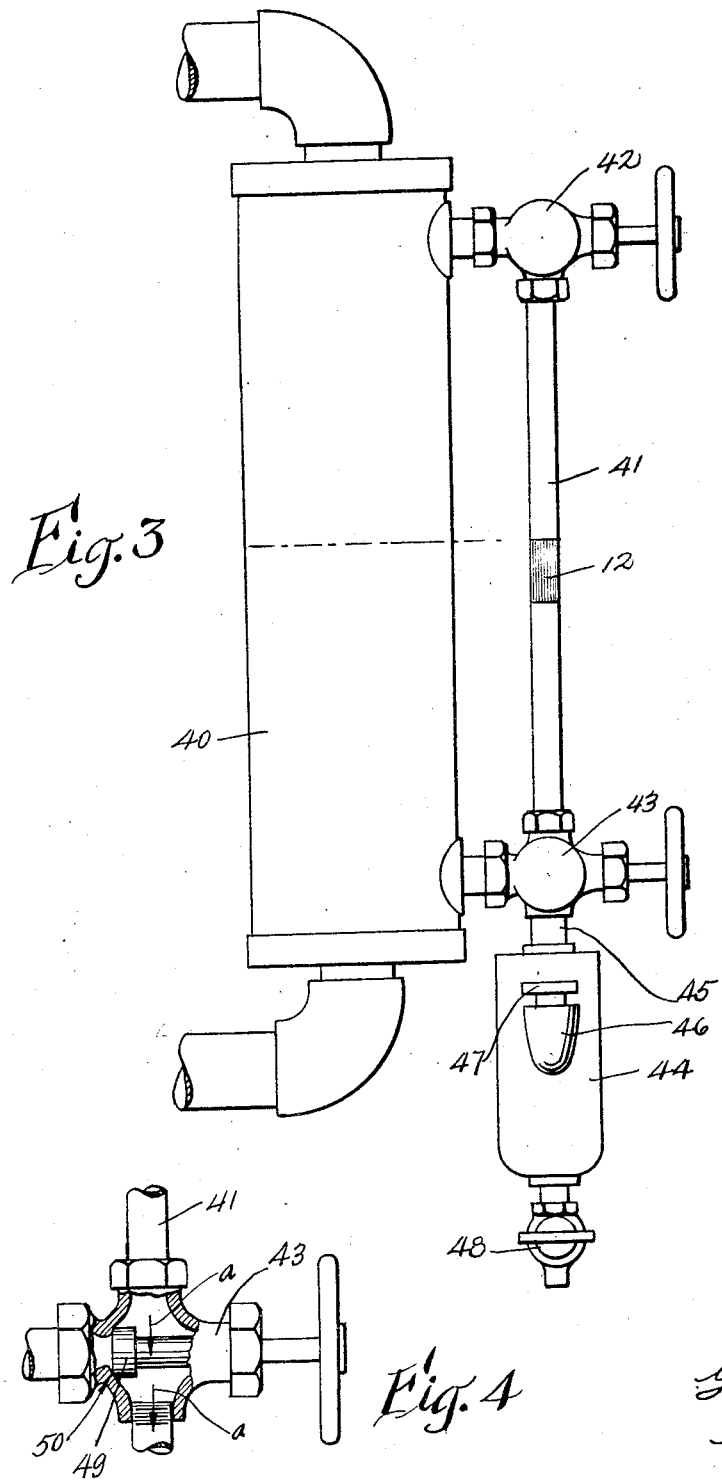

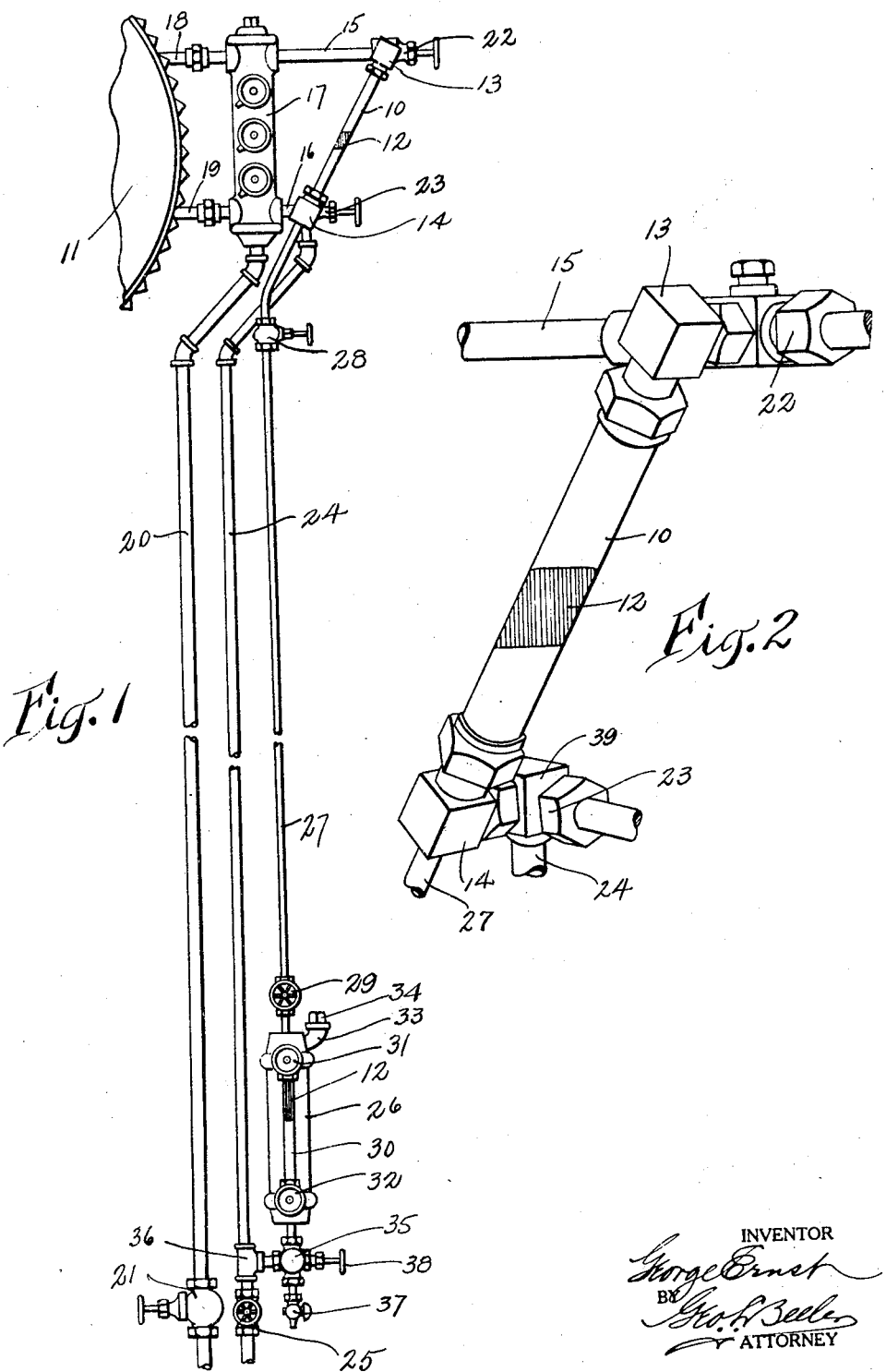

Patented Nov. 13, 1928.

1,691,545

UNITED STATES PATENT OFFICE.

GEORGE ERNST, OF NEWARK, NEW JERSEY.

GAUGE-GLASS ATTACHMENT.

Application filed December 17, 1925. Serial No. 76,043.

This invention relates to liquid level indicators and has particular reference to devices of that character adapted for use in connection with steam boilers or the like.

Among the objects of this invention is to provide a liquid level indicator comprising a usual gauge glass and the connections therefor with a liquid containing means, and a reservoir having a coloring liquid of a lower specific gravity than water to indicate with greater visibility the level of the water in the gauge glass, said reservoir being positioned below the lower end of the glass, and having communication therewith for the purpose stated whereby the accessibility of the reservoir for refilling is improved.

Another object of this invention is to provide a means for introducing into a sight gauge glass a coloring matter or material, preferably by upward displacement from any convenient point beneath the gauge glass, the upward displacement being the result of the buoyant action of a portion of the main body of water whose level is to be observed.

Another object of this invention is to provide a liquid level indicator comprising a gauge glass and means for connecting the same with a boiler or the like to indicate the level of the water therein, a reservoir situated in a conveniently accessible location regardless of the precise position or elevation of the gauge glass and arranged to introduce a colored indicating liquid of low specific gravity into the gauge glass, and connections between the reservoir and the gauge glass arranged in a novel and simple manner and including valves whereby the gauge glass can be blown down, or circulatory action created to facilitate the upward displacement of the coloring liquid into the gauge glass.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof, reference is had to the accompanying drawings in which like reference characters designate the same parts in the several views, and in which—

Figure 1 is a front elevation with parts broken away of the invention.

Fig. 2 is a perspective view of a portion of the gauge drawn to a larger scale.

Fig. 3 is a view in elevation of a modification.

Fig. 4 is an enlarged view showing a portion of the modification and with parts broken away.

Referring now more specifically to the drawings, I show my invention as including generally liquid level indicating means such as a gauge glass 10 which is inclined so that the liquid level therein may be visible to the naked eye although the glass be at a considerable elevation, which frequently occurs especially in power plants, the boiler 11 therewith the gauge has communication for indicating the water level therein being generally located far above the floor of the furnace or boiler room, sometimes as high as forty feet. While the gauge is accessible directly from such elevation or by any means that may be provided for the purpose, yet for frequent testing or manipulation that is troublesome, and therefore in practice I have found it advisable wherever possible to operate from a lower floor of the power plant. With this in mind it will be understood that in arranging and devising means for introducing a coloring matter as an indicator into the gauge glass from the lower floor or other convenient point of the power plant, I have made a distinct improvement or advance in power plant engineering.

The coloring liquid 12, which is preferably red, and includes a kerosene base, acts to increase the visibility of the liquid level in the gauge glass. The liquid being of a lower density than water rests thereon, and in any event remains in the gauge glass constantly. The color is of a distinctive or conspicuous character such as red. The gauge glass may be wholly or only partially filled with the coloring liquid, the latter being my preferred method of operation. The liquid level in the gauge glass can in this way be observed at a great distance with ease and accuracy. If an oil is used, its solvent qualities will be available for cleaning the walls of the gauge glass of sediment or other deposit that usually accumulates in a gauge glass.

Any convenient or conventional connections can be provided between the gauge glass and the boiler as, for instance, the heads 13 and 14 communicating with the upper and lower ends of the glass. These heads are connected to nipples 15 and 16 which communicate with a water column 17 at the upper and lower ends thereof, the column having connection with the boiler by means of pipe connections 18 and 19 at its upper and lower ends. A pipe 20, and valve 21 at its lower end, constitutes a blow down for the column 17. Valves 22 and 23 communicate with heads 13 and 14 respectively to permit the gauge glass to be cut off from communication with the boiler. A pipe 24 having a valve 25 at its lower end forms a means whereby the gauge glass may be blown down.

A reservoir 26 is provided positioned below the lower head of the gauge and communicates therewith directly by means of a pipe 27. Suitable valves for the pipe 27 may be provided positioned as may be found convenient, preferably one 28 at the upper end of said pipe immediately adjacent to the head 14 and normally open, and the other 29 at the lower end of the pipe near the reservoir 26 and normally closed. A gauge glass 30 is provided on the reservoir to indicate the quantity of coloring matter therein. The conventional valves 31 and 32 are provided at the heads of said glass. Any suitable means is provided whereby coloring liquid can be introduced into the reservoir, such as an elbow 33 normally closed by a plug 34 and located preferably at the upper portion of the reservoir. A cross valve 35 of the type shown in Fig. 4 is connected at the outlet or bottom of the reservoir or chamber 26 and communicates with the blow down pipe 24 by means of a T 36 positioned above the blow down valve 25. A pet cock 37 is at the outlet of the cross valve and serves to seal the cross valve against the flow of a liquid therethrough in a direction except toward or from the T 36. The cross valve 35 may assume any convenient form and is preferably a standard commercial valve which will permit of a continuous flow through the body in one direction through one set of aligned connections, while the flow of a liquid therethrough is controlled by the valve seated in another connection. Thus it will be seen that if the valve is opened gradually or slightly as by manipulation of a hand wheel 38 or the like, flow may occur past the seat of the valve from the T 36 into the chamber 26 as may be desired. On the other hand, when the valve is closed such flow is prevented. However, liquid may flow when desired through the valve out from the chamber 26 and through the pet cock 37 regardless of whether the cross valve is open or closed.

The operation of the gauge glass attachment may be briefly described as follows: The valves 29, 35, and the pet cock 37 are closed while the plug 34 is removed and any suitable coloring or other indicating matter, preferably an oil lighter than water, is introduced into the chamber 26 through the inlet 33 and the said chamber is preferably filled thereby. The plug 34 is then reinserted. The valves 29 and 35 are now opened and a certain quantity of oil or coloring matter will be displaced upward as a result of the difference in weight between the same and the water within the pipe 24, said oil passing through the pipe 27 past the valve 28 and thence directly into the inclined gauge glass 10. Any suitable quantity of oil may thus be displaced into the gauge, though preferably for the sake of economy of operation only an inch or so of oil is used in the gauge glass 10. The valves 29 and 35 will now be closed and the apparatus will thus remain in reliable condition ready for future use whenever it should be desired again to introduce a quantity of the coloring liquid into the gauge glass. A circulatory action obtains when the oil is being displaced to render the upward flow of the oil through the pipe 27 fairly rapid, overcoming the frictional resistance of said pipe which may be of a rather considerable length. More specifically, referring to Fig. 2, it will be observed that the blow down pipe 24 has communication at its upper end with a head 39 which has communication with the lower head 14 of the liquid level indicating gauge. On the other hand, the pipe 27 is attached directly into the bottom of the head 14, and hence the pipes 24 and 27 have in effect communication with each other at their upper and lower ends. Connection of the oil pipe 27 directly into the lower head 14 insures that the oil flowing upward into the gauge glass 10 will be wholly received therein and none of it lost through any other communicating connection. The pipe 27 is preferably made of rather small size, such as one-quarter inch or the like, for the sake of not only economy, but also to insure a certain amount of retardation against a too rapid flow or displacement of the oil. In this way an accurate control may be obtained and the quantity of oil deposited in the gauge may be regulated exactly, while at the same time the valves used for such manipulation may be ordinary globe or other standard valves of an inexpensive type. Likewise the small diameter of the pipe 27 insures against displacement of the oil by water directly in said pipe by connection or the like, the valve 28 being normally left open and the chamber cut out of circulatory relation merely by closing the valves 29 and 35. Whenever it is desired to blow down the gauge this result may be readily obtained in the usual manner as by merely opening the valve 25. The valves 22 and 23 are manipulated from the flow usually by means of chains attached to their wheels, and by their manipulation in succession the desired results are obtained in the usual way. When the gauge glass is blown down the modicum of color at 12 is discharged and wasted, and as a result of repeated blow downs and replacement of the color in the glass the chamber 26 becomes filled with the stagnant displacement water from the pipe 24. In order to drain the displacement water from the chamber 26 it is merely necessary to open the plug 34 and pet cock 37. The chamber may likewise be cleaned by opening the valve 29 and causing water to flow therethrough.

In Figs. 3 and 4 I show a modification of my invention which is directly applicable to house heating or other low down boilers such as are ordinarily stationed directly on the floor of the basement and in which the water level indicating gauge is consequently within convenient reach of the operator. Thus the water column 40 is connected directly with the boiler which being of any usual or conventional design is not shown in the drawings, the gauge glass 41 having communication with said column at its upper and lower ends as by means of the angle valves or heads 42 and 43. The upper valve 42 may be of any conventional construction such as is usually used in connection with gauge glasses. The lower valve, however, is of the type ordinarily denominated as a cross valve and is shown with parts in section in Fig. 4. A reservoir or chamber 44 is connected directly into the lower head or valve 43 as by means of a short nipple 45 or the like, so as to be below the valve 43. Means is provided whereby the chamber 44 may be filled conveniently, said means taking the form, for the sake of simplicity, of an elbow 46 through which the coloring matter of any suitable form may be introduced directly by the action of gravity, said elbow being then sealed by means of a plug 47. The pet cock 48 is provided at the lower end of the chamber to permit the same to be drained whenever desired. The cross valve comprises a valve 49 arranged to seat at 50 so as to seal the column 40 at its lower end, this being especially for the purpose of replacement of the gauge glass should the same break, or generally for purposes of repair as when the packing at the junction of the gauge glass becomes worn out or leaky. In any event flow may always be obtained through said valve as shown by arrows *a* regardless of whether the valve is open or closed. When it is desired to blow down the gauge glass the cross valve is preferably closed, while the upper valve is opened and a flow of steam thereby occurs through the gauge glass and directly through the chamber 44 upon opening the pet cock 48. Then to test the lower nipple connection with the water column the valve 42 is closed and the valve 43 opened, so that water will be blown down through the chamber 44 and pet cock. The pet cock 48 may, in old installations, be the one found attached to the valve fitting at 43, but on its removal therefrom the nipple 45, preferably of larger bore than the pet cock, is adapted to its place for the attachment of the chamber 44 as shown.

The operation of this form of my invention is extremely simple, it being observed that oil or any other suitable coloring matter or color conveyer may be readily introduced into the chamber 44 when both the upper and lower valves 42 and 43 are closed and the plug 47 is removed, the pet cock being opened to drain the normal charge of displacement water and then again closed. While the amount of coloring matter so introduced may be adjusted to suit the desires of the operator, I prefer to insert only such quantity as is desired to be within the gauge glass itself. In other words, in order to obtain one inch of color column in the gauge glass only a correspondingly small quantity is put into the chamber 44. After the plug 47 is returned and screwed tightly into the elbow the valves are opened, first the valve 42 and then slightly the valve 43. Water now flows gradually from valve 43 into the chamber 44 and as the chamber fills with the water it displaces the color therein, causing the same to rise upward into the gauge glass which is preferably for this purpose in direct alignment with the outlet of said chamber. The outlet or nipple 45 is of such size as to facilitate the displacement of the coloring matter by the water.

The coloring matter which I preferably employ is a red liquid so as to be visible at a considerable distance, and an oil combined therewith having a solvent action on the sediment or other material that deposits normally within the walls of a gauge glass and obscures the reading of the water level therein. The safety and reliability of the gauge glass is thus greatly increased and the opportunities of the water in the boiler running too low because of improper functioning of the gauge glass are eliminated. Likewise the convenience of the operator is served and considerable labor thereby saved.

I claim:

1. A device of the character described, including a gauge glass, heads at the upper and lower ends thereof communicating with a boiler, a reservoir containing coloring liquid positioned remotely below the lower head, means connecting said reservoir with said lower head, and means controlling the flow of liquid from said reservoir into said glass.

2. The combination with a boiler positioned at a considerable elevation above the floor, and a water level gauge for the boiler, of means for introducing into said gauge a liquid having a color visible from said floor, said means including a reservoir adjacent to said floor, means connecting the reservoir and said gauge, and means adjacent to said floor to control the flow of liquid from said reservoir into said gauge and operative from said floor.

3. The combination with a boiler positioned at a considerable elevation above a floor, and a water level gauge for the boiler, of means for introducing a coloring liquid into said gauge, said liquid being lighter than water, a pipe connecting said reservoir and said gauge, a pipe connecting the boiler below the water level thereof with said reservoir to cause water from the boiler to force said liquid upward into the gauge, and means to control the flow of said liquid.

4. The combination as in claim 3, wherein the gauge is provided with upper and lower heads, the first mentioned pipe being directly connected at its upper end to the lower head of the gauge, the second mentioned pipe having indirect connection with the lower head of the gauge.

5. The combination as set forth in claim 3, wherein the gauge is provided with upper and lower heads, the first mentioned pipe connecting to the lower head at the bottom thereof, the second mentioned pipe connecting to said lower head at a side thereof.

6. The combination as set forth in claim 3, wherein the first mentioned pipe is of relatively small diameter to frictionally retard the flow of said liquid therethrough.

7. The combination with a boiler and a water gauge having upper and lower heads, of means for inserting a coloring liquid into said gauge, said means including a reservoir below the lower head and communicating therewith, permitting the gauge and reservoir to be blown out simultaneously.

In testimony whereof I affix my signature.

GEORGE ERNST.